(12) United States Patent
Ari et al.

(10) Patent No.: US 12,301,423 B2
(45) Date of Patent: May 13, 2025

(54) SERVICE MAP CONVERSION WITH PRESERVED HISTORICAL INFORMATION

(71) Applicant: ServiceNow, Inc., Santa Clara, CA (US)

(72) Inventors: Tal Ben Ari, Ness Ziona (IL); Rotem Steuer, Modin (IL)

(73) Assignee: ServiceNow, Inc., Santa Clara, CA (US)

( * ) Notice: Subject to any disclaimer, the term of this patent is extended or adjusted under 35 U.S.C. 154(b) by 416 days.

(21) Appl. No.: 17/590,377

(22) Filed: Feb. 1, 2022

(65) Prior Publication Data

US 2023/0246916 A1    Aug. 3, 2023

(51) Int. Cl.
*H04L 41/12* (2022.01)
*H04L 41/22* (2022.01)

(52) U.S. Cl.
CPC .............. *H04L 41/12* (2013.01); *H04L 41/22* (2013.01)

(58) Field of Classification Search
CPC ....... H04L 41/12; H04L 41/22; H04L 41/024; H04L 41/0895; H04L 41/5058; G06F 16/252
USPC ........................................................ 370/254
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |

(Continued)

OTHER PUBLICATIONS

Anonymous: "Rome IT Operations Management—Zeite 1—291"; Oct. 8, 2021 (XP093037482); [retrieved from Internet https://downloads.docs.servicenow.com/pdf/dede/servicenow-rome-it-operations-management-dede.pdf—retrieved on Apr. 5, 2023]; pp. 268-289.

(Continued)

*Primary Examiner* — Jutai Kao
*Assistant Examiner* — Syed M Bokhari
(74) *Attorney, Agent, or Firm* — FLETCHER YODER PC

(57) ABSTRACT

A first type of service map may be converted to a second type of a service map by adding a conversion tag to a set of configuration items (CIs) presented by the service map. The conversion tag includes data that may be used to link historical information associated with the service map of the first type, such as information related to incidents, alerts, change requests, and other events, to the second type. A second service map may be generated using the conversion tags and/or tag-based filtering processes such that the second service map displays different CIs as compared to the first service map.

20 Claims, 8 Drawing Sheets

(56) References Cited

U.S. PATENT DOCUMENTS

| | | |
|---|---|---|
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,560,543 B2 * | 10/2013 | Waschke ............... G06F 8/71 |
| | | 707/756 |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,065,683 B2 | 6/2015 | Ding |
| 9,122,552 B2 | 9/2015 | Whitney |
| 9,183,264 B2 * | 11/2015 | Wada ............... G06F 9/44505 |
| 9,239,857 B2 | 1/2016 | Trinon |
| 9,535,737 B2 | 1/2017 | Joyv |
| 9,557,969 B2 | 1/2017 | Sharma |
| 9,792,387 B2 | 10/2017 | George |
| 11,095,506 B1 * | 8/2021 | Erblat .................. H04L 67/51 |
| 2009/0037931 A1 * | 2/2009 | Qiu ..................... H04L 67/34 |
| | | 719/314 |
| 2009/0187596 A1 * | 7/2009 | Akiyama ........... G06F 9/44505 |
| 2009/0319537 A1 * | 12/2009 | Westerfeld ............ G06Q 10/10 |
| | | 707/999.102 |
| 2017/0308601 A1 * | 10/2017 | Massarenti ......... H04L 41/0816 |
| 2018/0300041 A1 * | 10/2018 | Tilikin .............. G06F 11/0781 |
| 2019/0104023 A1 * | 4/2019 | Rimar ................. H04L 43/045 |
| 2020/0084115 A1 * | 3/2020 | Biran ................. H04L 43/045 |
| 2020/0236129 A1 * | 7/2020 | Barkovic ............ H04L 43/045 |
| 2020/0404059 A1 * | 12/2020 | Feiguine ............... H04L 67/51 |
| 2021/0320836 A1 * | 10/2021 | Leibkowiz ......... H04L 41/0631 |
| 2021/0357427 A1 * | 11/2021 | Ben Ari ............... G06F 16/285 |

OTHER PUBLICATIONS

International Search Report and Written Opinion for PCT Application No. PCT/US2023/011997 dated Apr. 20, 2023; 9 pgs.

* cited by examiner

| ≡ KEY VALUES | NEW | SEARCH | CREATED ▼ | SEARCH | | 1 | TO 20 OF 977 ▲▲ |
|---|---|---|---|---|---|---|---|
| ▽ ALL > KEY != serviceName > KEY != ROTEMTEST | | | | | | | |
| ⚙ | ≡ CREATED | | ≡ CONFIGURATION ITEM | | ≡ KEY | ≡ VALUE | |
| ☐ | 2021-06-16 04:39:36 | | TOMCAT | | APP | APP1,APP2,APP3 | |
| ☐ | 2021-06-09 23:56:05 | | TOMCAT@XLQHPOMIGW03 | | ENV | PROD | |
| ☐ | 2021-05-10 06:27:28 | | CLOUD LB | | APP | GOOGLE | |
| ☐ | 2021-05-10 06:27:28 | | VM INSTANCE | | APP | GOOGLE | |
| ☐ | 2021-05-10 06:27:28 | | LAMBDA FUNCTION | | APP | GOOGLE | |
| ☐ | 2021-05-10 06:27:26 | | K8s POD | | APP | KUBERNETES | |
| ☐ | 2021-05-10 06:27:26 | | OS PROJECT | | APP | KUBERNETES | |
| ☐ | 2021-05-10 06:27:26 | | K8s NAMESPACE | | APP | KUBERNETES | |
| ☐ | 2021-05-10 06:27:26 | | K8s POD | | APP | KUBERNETES | |

*FIG. 10*

SERVICE MAP CONVERSION WITH PRESERVED HISTORICAL INFORMATION

BACKGROUND

The present disclosure relates generally to converting service maps into different types using tags that enable users to modify and maintain the converted service maps using techniques associated with both types.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g., computing devices, load balancers, firewalls, switches, etc.) and software resources (e.g., productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

As part of performing these core functions, enterprises or cloud service providers may maintain a configuration management database (CMDB) that stores information related to hardware and software assets associated with the enterprise. A service map may provide a visualization that is useful for monitoring the assets and identifying IT issues. However, if it becomes desirable to change a type of service map used by the enterprise, it may be difficult to create a new service map due to the volume of hardware and software assets utilized by the enterprise and algorithms used for discovering the assets.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Accordingly, the techniques disclosure herein may improve the efficiency of certain operations related to the monitoring and maintaining of assets (e.g., configuration items (CIs) such as hardware assets, software assets, licenses, and so forth) managed by a configuration management database (CMDB). For example, a processor may receive a request to convert a service map from a first type to a second type, such as converting from a manual service map to a tag-based service map. In general, the service map is a visual representation of relationships (e.g., connections and dependencies) between multiple assets. The assets displayed on the service map may be manually selected or input (e.g., manual service maps) or built based on filter criteria (e.g., tag-based service maps). In any case, it may be advantageous to convert manual service maps to tag-based service maps while preserving certain information (e.g., records, historical information, and the like) recorded for the manual service map. Accordingly, a subset of the assets displayed on the service map may be identified to tag with a conversion tag that indicates the manual service map before conversion and the converted tag-based service map. After tagging the subset or all of the CIs with the conversion tag, a service map generation technique (e.g., a tag-based technique) may be applied to generate a converted service map (e.g., converted tag-based service map). By including the conversion tag with the CIs, tickets (e.g., incidents, change requests, and the like) and other historical information may still be linked from the previous service map to the converted tag-based service map, thereby enabling users to convert to a different type of service and minimizing or preventing loss of information that may occur otherwise. Moreover, the included conversion tag may facilitate propagating updates made to CIs. For example, a user that updates a CMDB, such as by modifying information associated with a service map (e.g., other converted service maps, tagged-based service maps, and manual service maps) and/or conversion tags, may trigger an update to additional service maps that include a CI affected by the modified information. In this way, the conversion tags added during the disclosed conversion process may facilitate converting service maps to new types without loss of functionality.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 is a screenshot of a portal displaying records having fields that store information from conversion tags, in accordance with aspects of the present disclosure.

DETAILED DESCRIPTION

Figure 1:
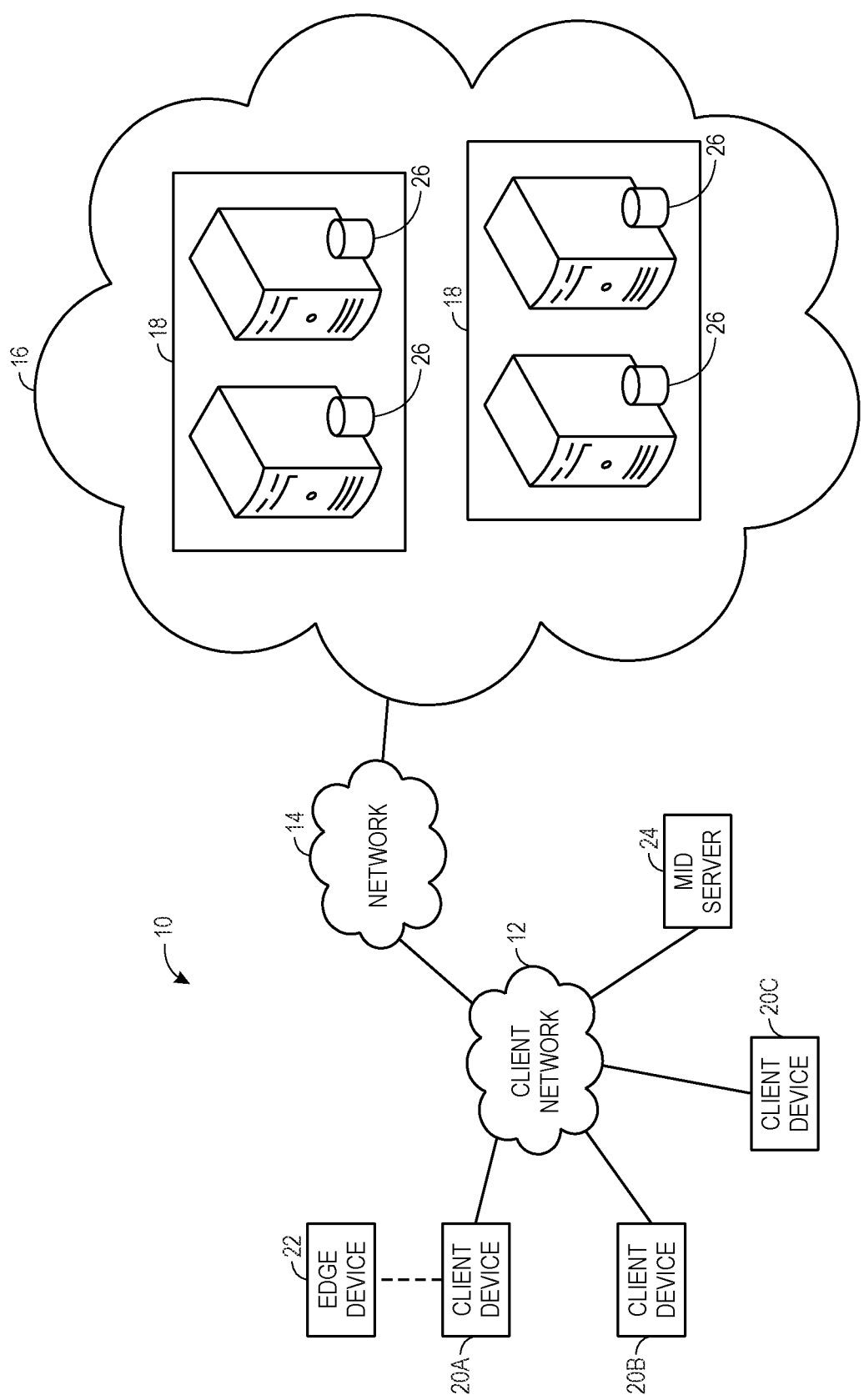
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored, such as in a CMDB.

Information Technology (IT) networks may include a number of computing devices, server systems, databases, and the like that generate, collect, store, and distribute data. Graphical user interfaces (GUIs) may provide interactive objects that may be viewed and/or manipulated by a user and that may facilitate usage of this data. As GUIs become increasingly complex, it may be more difficult to discern characteristics of the GUIs' interactive objects.

With this in mind, an IT system may include service map logic that generates an accurate, service-aware view (e.g., a "service map") of the system infrastructure that is frequently refreshed, keeping the view up to date. The service map may be constructed by discovering and mapping relationships between the IT infrastructure for service-affecting changes and updating the service map in real-time. The service map may provide a mix of applications and IT components that support a service and provide an understanding of how these application and components are related.

A service map may be generated using various techniques, such as manual techniques (e.g., resulting in a "manual service map") or tag-based techniques (e.g., "tag-based service map"). In general, a manual service map may be generated by way of a query resulting in CIs matching criteria of the query, and assigning and/or connecting CIs to produce the service map. More specifically, in an example when a manual service map is generated using a query, a user may submit a query indicating one or more criteria associated with assets, such as an asset type (e.g., servers) running a particular operating system. Accordingly, a software application used for generating the service map may discover CIs that satisfy the one or more criteria specified by the query. In an example where a manual service map is generated by connecting CIs, a service CI may be created (e.g., identified via discovery) and one or more CIs that are downstream of the service CI may be connected to the service CI. Furthermore, one or more additional CIs that are downstream (or upstream) of the connected CI may be added to the manual service map. In this way, the service map may indicate directional relationships (e.g., indications of resources that run on other, connected resources (e.g., upstream or downstream resources)), which may improve the efficiency of monitoring CIs depicted in the service map.

As noted above, a service map may also be generated using tag-based techniques (e.g., resulting in a tag-based service map). In general, a "tag" may include a key value pair that indicates information associated with a CI. At least in some instances, the "tags" may be associated with a CI based on a user input. In some embodiments, a service map may be generated using tags such that the resulting service map may provide a visualization of CIs having a particular tag as well as the directional relationship (e.g., CIs downstream of the CIs having the particular tag). In this way, generating a service map using tags may enable IT personnel to more efficiently generate service maps by providing an additional criteria for filtering out certain CIs.

At least in some instances, such as an example when a manual service map is being generated, one or more unexpected CIs may be added to the manual service map. In general, an unexpected CI may be a CI that the user does not wish to receive data from or have included in a calculation associated with the service map. For example, the service map including an unexpected CI may indicate an application downtime that is irrelevant to the service map, but nonetheless included on the service map until the service map is fixed (i.e., the unexpected CI is removed and the expected CI is added). Additionally, unexpected CIs may include extraneous CIs that are related to an expected CI (e.g., a switch may be associated with a particular server) and be downstream of the expected CI, but the extraneous CI may include irrelevant information that affects calculations performed on the service map. Additional examples of extraneous CIs may include network cards, files, file directories, switches, templates defined for an application, and the like. In any case, calculations involving unexpected CIs and extraneous CIs may utilize a relatively large amount of memory and CPU time that may otherwise be utilized for other operations. Furthermore, additional unexpected CIs that are downstream of the unexpected CI may be added to the service map and/or expected CIs (e.g., that a user may desire to monitor) may not be added to the service map. In either of the examples described above, the resulting service map may be inaccurate and calculations performed on the service map may indicate an unexpected or incorrect result.

Accordingly, the present disclosure is directed to techniques for converting a first type of service map (e.g., manual service maps) to a second type of service map (e.g., tag-based service map) using conversion tags rather than generating a new service map with a tag-based service. Additionally, the disclosed techniques may provide users with service maps having the selectivity associated with tag-based service maps, while still enabling users to make modifications using manual techniques. In general, the disclosed techniques include scanning or traversing CIs in a storage structure or medium, e.g., a CMDB, that are associated with a manual service map and adding conversion tags to the CIs that satisfy certain criteria (e.g., user input criteria or otherwise). For example, the criteria may include a core CI class list (e.g., CI inclusion list). As such, a processor may add conversion tags to the CIs that match the CIs indicated by the core CI class list. In general, the conversion tag may include a key that indicates the converted service map and a value that indicates the current manual service map (i.e., before conversion). After the CIs are tagged with conversion tags, the manual service map may be reclassified as a converted tag-based service map. For example, a class of the service map may be changed from a value indicating a "manual service map" to a "tag-based service map." The converted tag-based service map may then be repopulated and/or recalculated based on tagged CI and traversal rules associated with tag-based CIs. As the conversion tag of the converted tag-based service map identifies the previous manual service map, historical information associated with the previous manual service map is maintained. That is, historical information such as tickets (e.g., incidents, change requests, and the like) that were related to the previous manual service map may be maintained. By preserving the history associated with the previous manual service map, users may continue to manage and monitor service maps without loss of data. Furthermore, the disclosed tagging with conversion tags may facilitate tracking of CIs such that updates made to one or more CIs associated with a manual service may be propagated into existing service maps.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
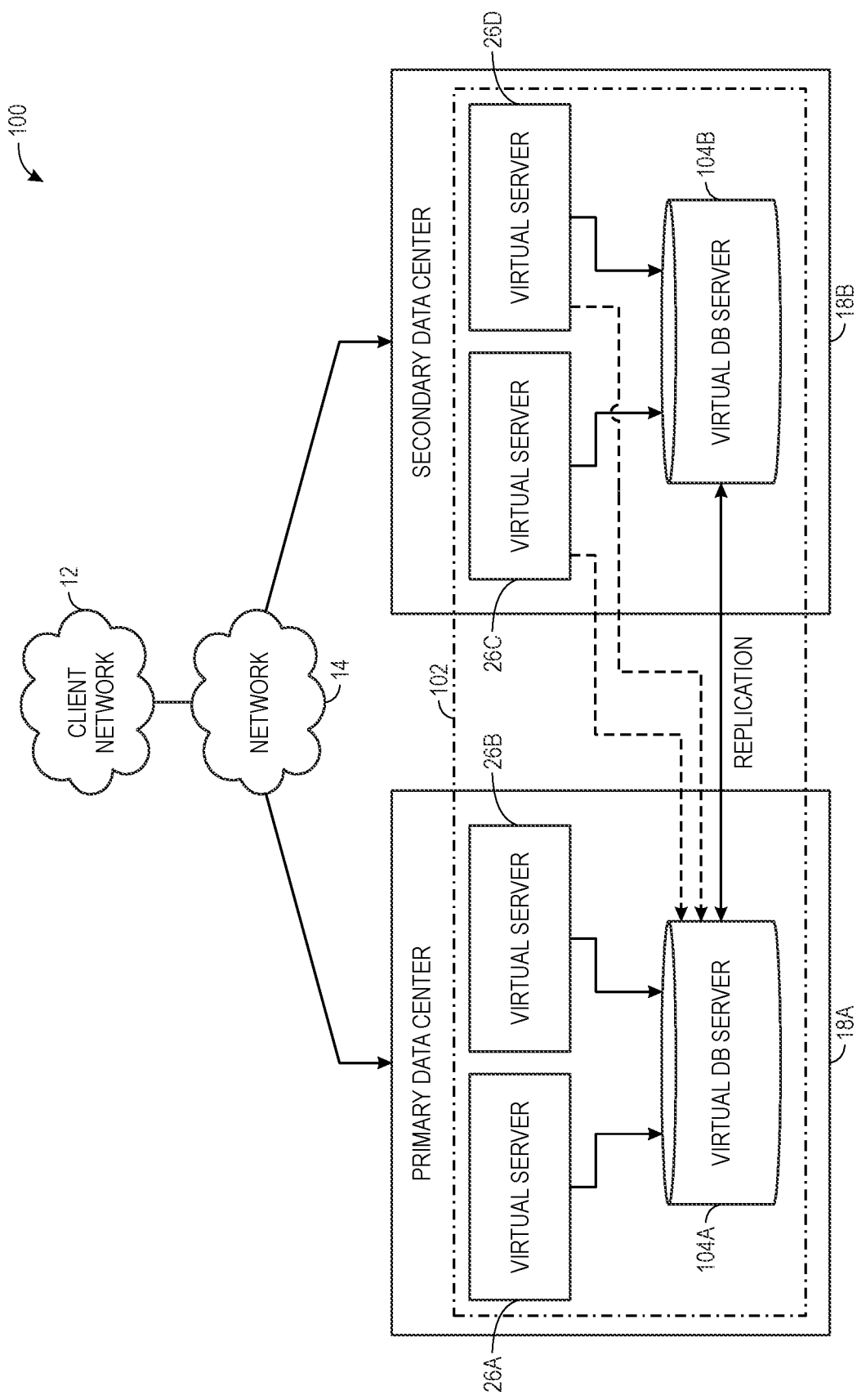
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
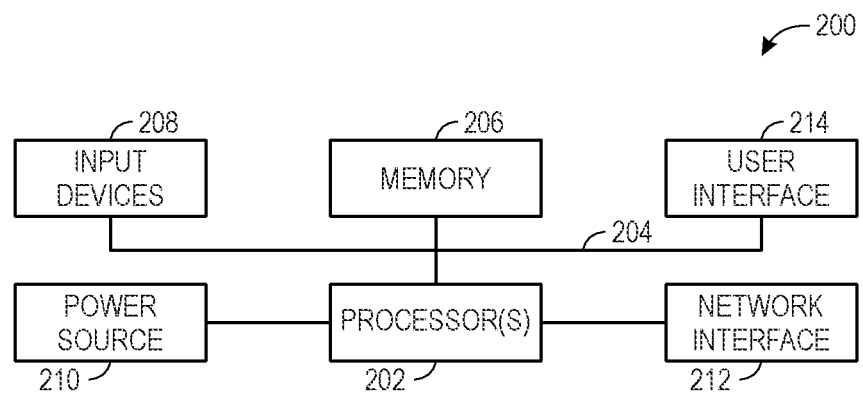
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 20, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
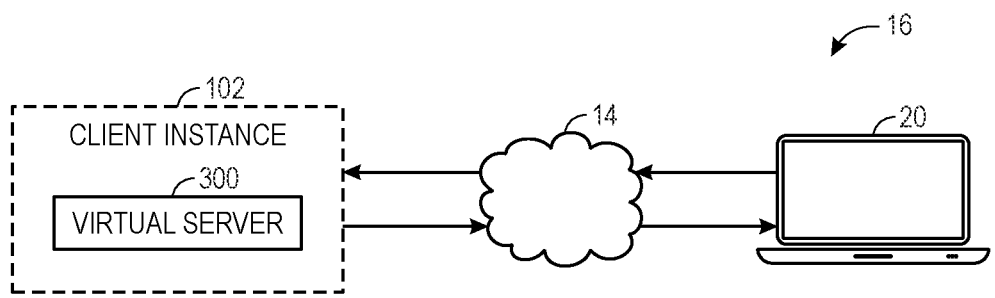
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 250 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
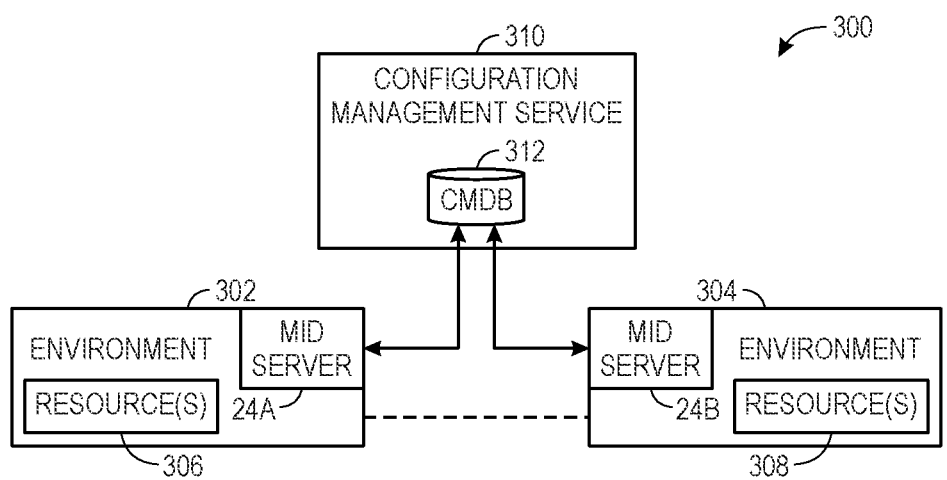
FIG. 5 is a block diagram of an embodiment of an electronic computing and communication system for discovering and/or managing connected configuration items (CIs) connected to a network, in accordance with aspects of the present disclosure.

FIG. 5 is a block diagram of an embodiment of an electronic computing and communication system 300 for discovering and/or managing connected configuration items. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping.

For example, the environments 302, 304 may include a customer service environment used to represent customer service infrastructure in a technical support, sales, billing, and/or other groupings. Similarly, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 of the environments 302, 304 may communicate with each other across environments. However, in some embodiments, aspects of various environments may be provided by different vendors without communication therebetween. In such embodiments, the resources of disparate environments may communicate using the platform (e.g., a configuration management service 310 that is a part of a cloud service platform including a CMDB 312 or comparable configuration management data structure). The resources 306 and 308 may include any suitable configuration item.

The configuration management service 310 may include one or more servers providing access to and managing the CMDB 312. The configuration management service 310 may allocate or provision resources, such as application instances in the resources 306 or 308 from a respective environment 302 or 304. Further, the configuration management service 310 may create, modify, or remove information in the CMDB 312 relating to the resources 306 or 308. Thus, the configuration management service 310 may manage a catalogue of resources in more than a single environment (even if the environments may not directly communicate with each other). In the illustrated embodiment, the configuration management service 310 may include a service map conversion 311 system that generally manages or modifies properties of service maps generated based on the CIs of the CMDB 312 or comparable data structure. Using this catalogue, the configuration management service 310 may discover new resources, provision resources, allocate resources, modify, and/or remove resources from the catalogue across a single environment or multiple environments. In some embodiments, these actions may be initiated as part of an operation executed on a client instance 102, may be scheduled for periodic occasions (e.g., periodic discovery), or may be a combination thereof. For example, a client instance 102 may receive a request, via its input structures, to query an identity of an application program interface (API) used by a resource to access a particular vendor/provider for the first environment 302 that is passed to the configuration management service 310 to query the CMDB 312. As another example, the client instance 102 may receive a request, via its input structures, to query an identity of a user authorized to access a particular resource that is passed to the configuration management service 310.

As previously discussed, the CMDB 312 (or comparable data or storage structure) may be populated utilizing a discovery process which may be used to discover the resources 306 or 308. Moreover, as previously discussed, the discovery process may include determining the properties or attributes of the resources 306 or 308 in their respective environments 302 or 304 using a respective administration or managerial device, agent, or server, such as a management, instrumentation, and discovery (MID) 24A or 24B. In the illustrated embodiment, each environment 302 and 304 has its own MID server 24A, 24B. In some embodiments, a single MID server may be employed when the MID server may reach into multiple environments. For example, if the MID server is run in the platform 16 shown in FIG. 1 (e.g., in the configuration management service 310), a single MID server may be used to manage both environments 302 and 304. Additionally or alternatively, if the MID server 24A of the first environment 302 has access to the second environment 304, the MID server 24B of the second environment 304 may be omitted.

Figure 6:
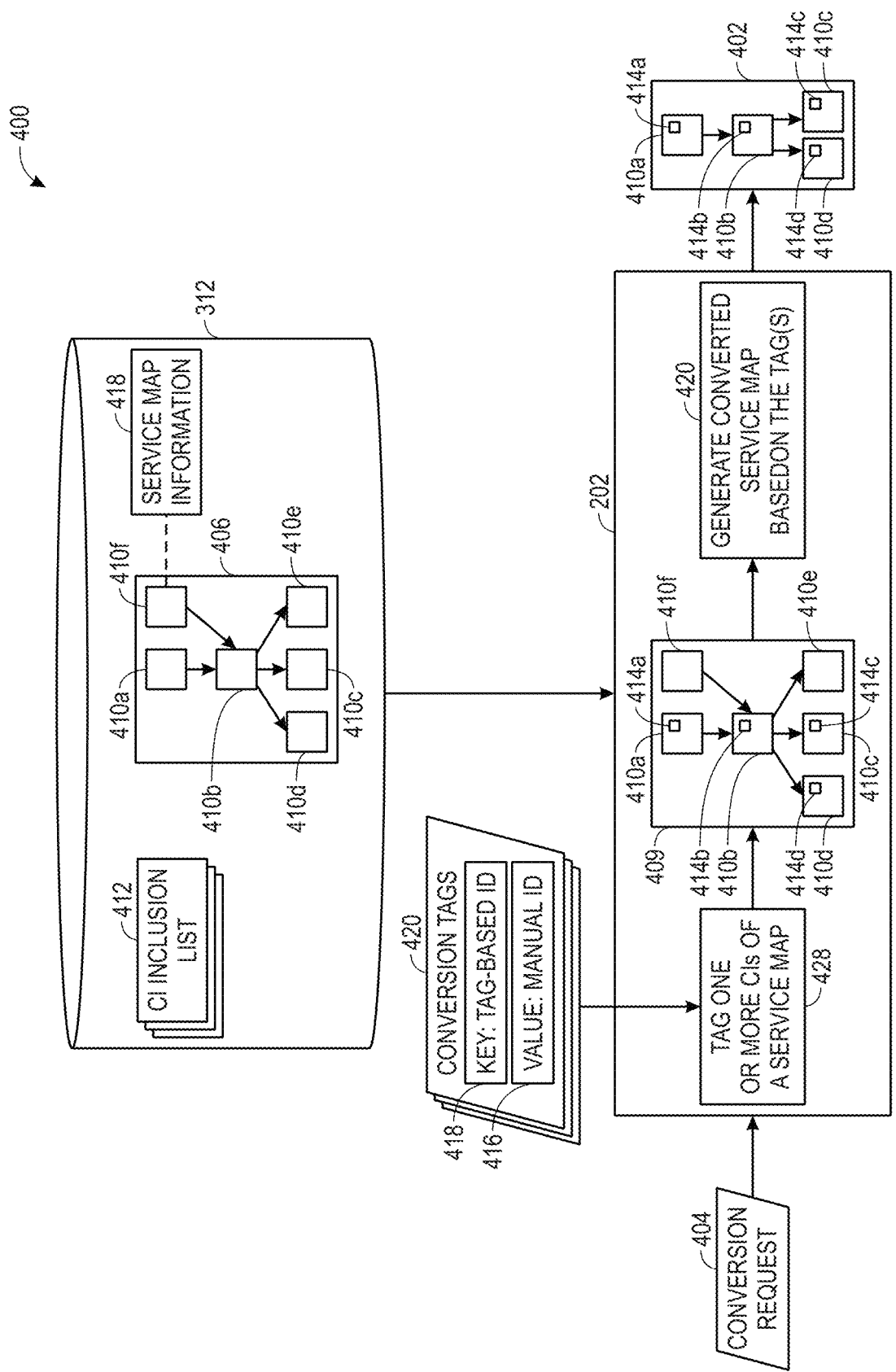
FIG. 6 is a flow diagram of an embodiment of a process to convert a service map using conversion tags, in accordance with aspects of the present disclosure.

As discussed herein, it may be advantageous to convert a service map of a first type (e.g., a first class) to a service map of a second type (e.g., a second class) while preserving information associated with the service map of the first type and/or instead of having to rebuild the entire service map. To illustrate conversion of a service map, FIG. 6 is a flow diagram of an embodiment of a process 400 to generate a converted tag-based service map 402 based on a received conversion request 404. In general, the steps of process 400 may be implemented by a client device 20 or a device or server in communication with such a device 20. In some embodiments, the process 400 may be implemented using a processor of the data center 18 by way of the client device 20.

To start the process 400, a processor 202 may receive a conversion request 404 indicating that one or more service maps are to be converted from a first type (e.g., a manual service map) to a second type (e.g., a tag-based service map). For example, the processor 202 may receive the conversion request via a user input indicating that the service map 406 is to be converted.

After receiving the conversion request 404, at block 408, the processor 202 may tag one or more CIs 410 of the service map specified or indicated by the conversion request 404 using conversion tags 414 to generate a tagged service map 409. In general, to tag the one or more CIs, the processor 202 may identify one or more of the CIs 410 to tag based on user input (e.g., a selection of CI 410) or using a CI inclusion list 412. In general, a CI inclusion list 412 may include criteria (e.g., user specified criteria) indicating certain CIs that should be tagged, whether based on a type of CI, a department that uses a CI, or other information that may be used to filter out or filter in certain CIs. For example, the criteria of the CI inclusion list 412 may specify that applications should be tagged as a user may wish to monitor applications. Additionally or alternatively, the criteria of the CI inclusion list 412 may indicate switches or other CIs should not be tagged as the user may not wish to monitor such CIs (e.g., CIs that may include redundant information). In any case, the processor 202 may tag a set of CIs of the CIs 410 in accordance with the user specified criteria and/or the CI inclusion list 412. Tagging the CIs 410 associates new data with the CIs, such as by adding the new data to a field of a record in the CMDB 312 that includes information associated with the respective CI 410. In the illustrated embodiment, the tagged service map 409 includes CIs 410a, 410b, 410c, and 410d that are tagged with the conversion tags 414a, 414b, 414c, and 414d, respectively. Additionally, CIs 410e and 410f are not tagged. Accordingly, information associated with the CIs 410a, 410b, 410c, and 410d, such as historical information, will be linked to the subsequently converted tag-based service map 402. Thus, historical information obtained using the manual service map 406 may be preserved for the tagged CIs 410 after the conversion to generate the converted tag-based service map 402.

As shown in the illustrated embodiment, the conversion tags 414 may include a value 416 that identifies the current type of service map (e.g., 'Manual ID'). Additionally, the conversion tags 414 may include a key 418 that identifies the converted type of the service map (e.g., 'tag-based ID'). In general, the value 416 and/or key 418 may include one or more strings that identify their respective information. In this way, service map information 418 (e.g., historical information, incidents, change requests) associated with one or more CIs (i.e., as indicated by the dashed line) may be preserved even after the service map 406 is converted. The historical information 412 may include information such as incidents associated with the CIs of the service map 406, such as change requests, alerts, incidents, and the like.

After tagging the service map 406 with the conversion tags 414 to generate the tagged service map 409, the processor 202, at block 420, may generate a converted tag-based service map 402. In general, to generate the converted tag-based service map 402, the processor 202 may repopulate or recalculate a service map based on CIs 410a, 410b, 410c, and 410d of the tagged service map 409 and/or using traversal rules for CI discovery. For example, the processor 202 may use tag-based rules, as would be understood by one of ordinary skill in the art, to determine CIs to include in the converted service map 402, such as by comparing metadata of the CIs 410 with reference metadata (e.g., stored in the database 312) and adding a set of the CIs 410 that have metadata that matches the reference metadata. In some embodiments, the processor 202 may cause a GUI to display the converted tag-based service map 402 on a computing device (e.g., the computing device 20 as described with respect to FIG. 4).

In this way, the process 400 may enable users to convert existing service maps to a desired type, such as converting a manual service map to a converted tag-based service map 402. The conversion tag may help to filter out CIs that a user may not desire to be included in a service map (e.g., the converted tag-based service map 402), as well as enable users that desire to maintain the service map using manual techniques to do so by way of the conversion tag linking to the manual service map.

As generally discussed above, it may be desirable to add or remove certain CIs from an existing service map. At least in some instances, information related to certain CIs may be updated, whether due to input from a user, a script, or otherwise. Accordingly, it may be desirable to update existing service maps based on updates to CIs, conversion tags, and/or the tags of the CIs made to other service maps, whether manual service maps, tag-based service maps, and/or converted service maps 402, thereby improving the efficiency of maintaining a CMDB.

Figure 7:
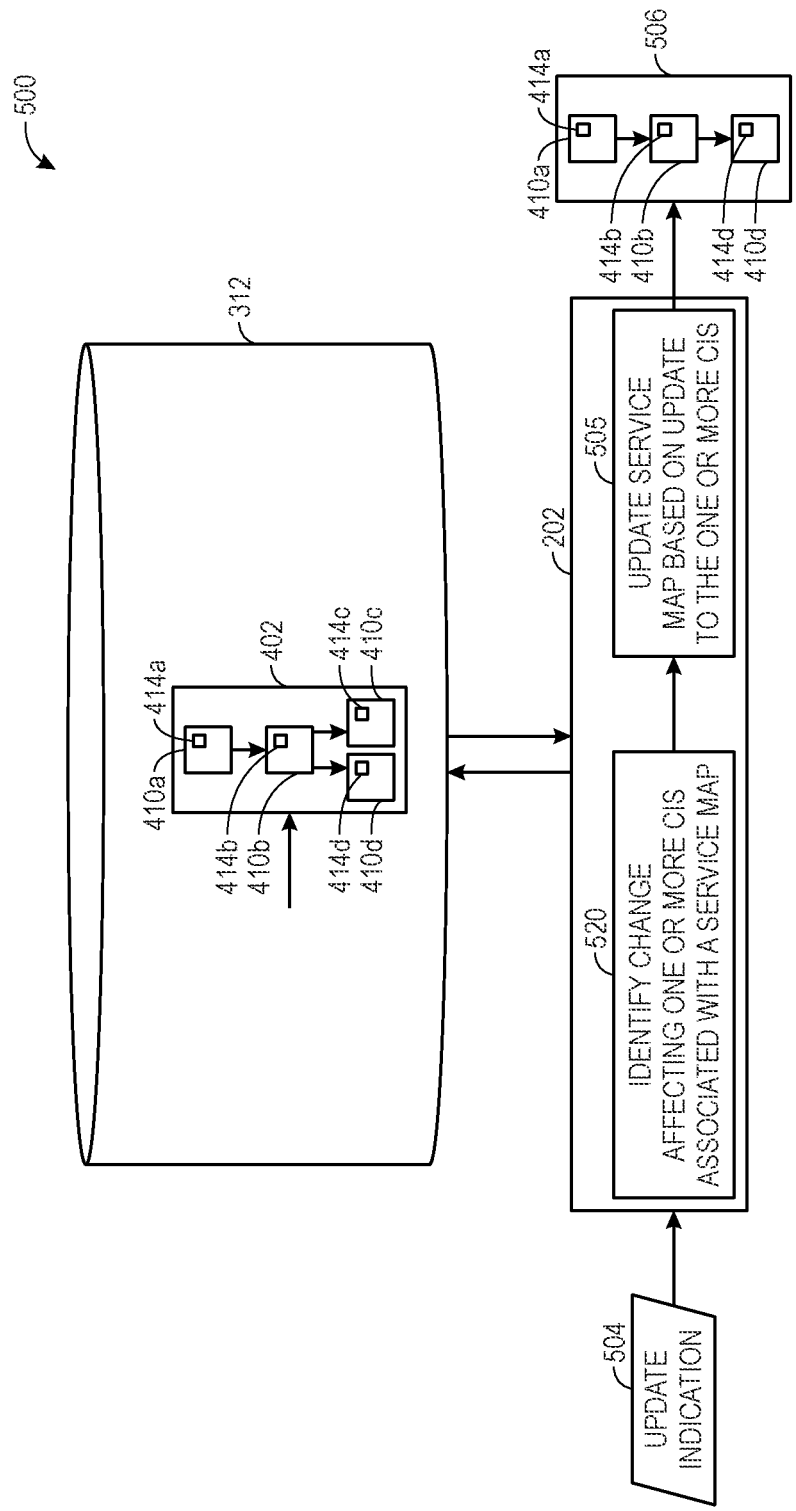
FIG. 7 is a flow diagram of an embodiment of a process for updating service maps using conversion tags, in accordance with aspects of the present disclosure.

For example, FIG. 7 is a flow diagram of an embodiment of a process 500 to update a converted tag-based service map 402 based on a changes made to a CMDB. In general, the steps of process 400 may be implemented by a client device 20 or a device or server in communication with such a device 20. In some embodiments, the process 400 may be implemented using a processor of the data center 18 by way of the client device 20.

To start the process, at block 502, the processor 202 may identify updates made to one or more CIs 410 based on a received indication. For example, the processor 202 may receive the indication in response to a user input causing a change to information associated with a CI. For example, the change to information associated with a CI may indicate that an application is running on a new server instead of a previous server. As such, the indication may specify a new relationship or dependency between a first CI (e.g., the application), a second CI (e.g., the previous server), and a third CI (e.g., the new server), such as the first CI being dependent on the third CI instead of the second CI. In some embodiments, the processor 202 may periodically (e.g., hourly, daily, weekly, and the like) scan the CMDB 312 to determine whether any updates have been made to one or more CIs. In some embodiments, the update indication 504 may specify the updates to the CI(s) 410, such as indicating that a CI was tagged with a conversion tag 414 or a conversion tag 414 was changed. Accordingly, one or more CIs of the CIs 410 of the converted service map 402 may be removed (e.g., not present in the converted tag-based service map 402 as compared to the service map 406) based on the update. It should also be noted that in some instances the changes to the conversion tags 414 may result in one or more CIs being added to a service map 410.

After identifying one or more updated CIs, the processor 202, at block 505, may update a converted tag-based service map 402 to generate an updated service map 506. In general, the processor 202 may repopulate or modify one or more converted tag-based service maps 402 having the CIs 410 tagged with conversion tags 414 that were updated. That is, manual changes made to CIs 410 having conversion tags 414 may cause the processor 202 to determine converted tag-based service maps 402 that includes the CIs 410 that were changed and update the converted tag-based service maps 402 accordingly. In general, service maps 402 may be updated by repopulating the converted tag-based service map 402 in a generally similar manner as described for block 420 of process 400 with respect to generating a service mapping. As shown in the illustrated embodiment, the converted tag-based service map 402 includes CIs 410a, 410b, 410c, and 410d each tagged with a conversion tag 414a, 414b, 414c, and 414d, respectively. The updated service map 506 still includes the CIs 410a, 410b, 410d, and their respective conversion tags 414a, 414b, and 414d, as compared to the converted tag-based service map 402, while CI 410c is not present in the updated service map 506.

In one non-limiting example of an implementation of the process 500, the processor 202 may receive the indication in response to a modification to a relationship or a newly added relationship, such as the result of a new application being installed on a server. As such, the processor 202 may identify a new relationship (i.e., "Runs on::Runs" indicating the new application runs of the server, and the server runs the new application). Accordingly, the processor 202 may tag the new application (e.g., based on a CI inclusion list) and proceed to block 505 to update the service maps 402 that include CIs 410 associated with the new or modified relationship. For example, the processor 202 may update service maps 402 that include the server running the new application.

In another non-limiting example of an implementation of the process 500, the processor may receive the indication in response to an upgrade of a CI (i.e., a new version of an application was released, RAM was increased for a server, and other changes affecting attributes of the CIs). Accordingly, the processor 202 may tag the upgraded CI (e.g., based on a CI inclusion list) may proceed to block 505 and update other service maps 402 that include the CIs 410 that were upgraded.

In another non-limiting example of an implementation of the process 500, the processor 202 may receive the indication in response to changes to a CI tag key or value. For example, a tag-based service map may be configured to show CIs having a first tag value (e.g., "env=PROD"). As such, if the tag value of a first CI displayed on the tag-based service map is changed from the first tag value to a second tag value (e.g., "env=QA"), then updating the service map would result in removing the first CI from the service map. Additionally, other service maps that are configured to display CIs have the first tag value, but not the second tag value, would similarly be updated.

Figure 8:
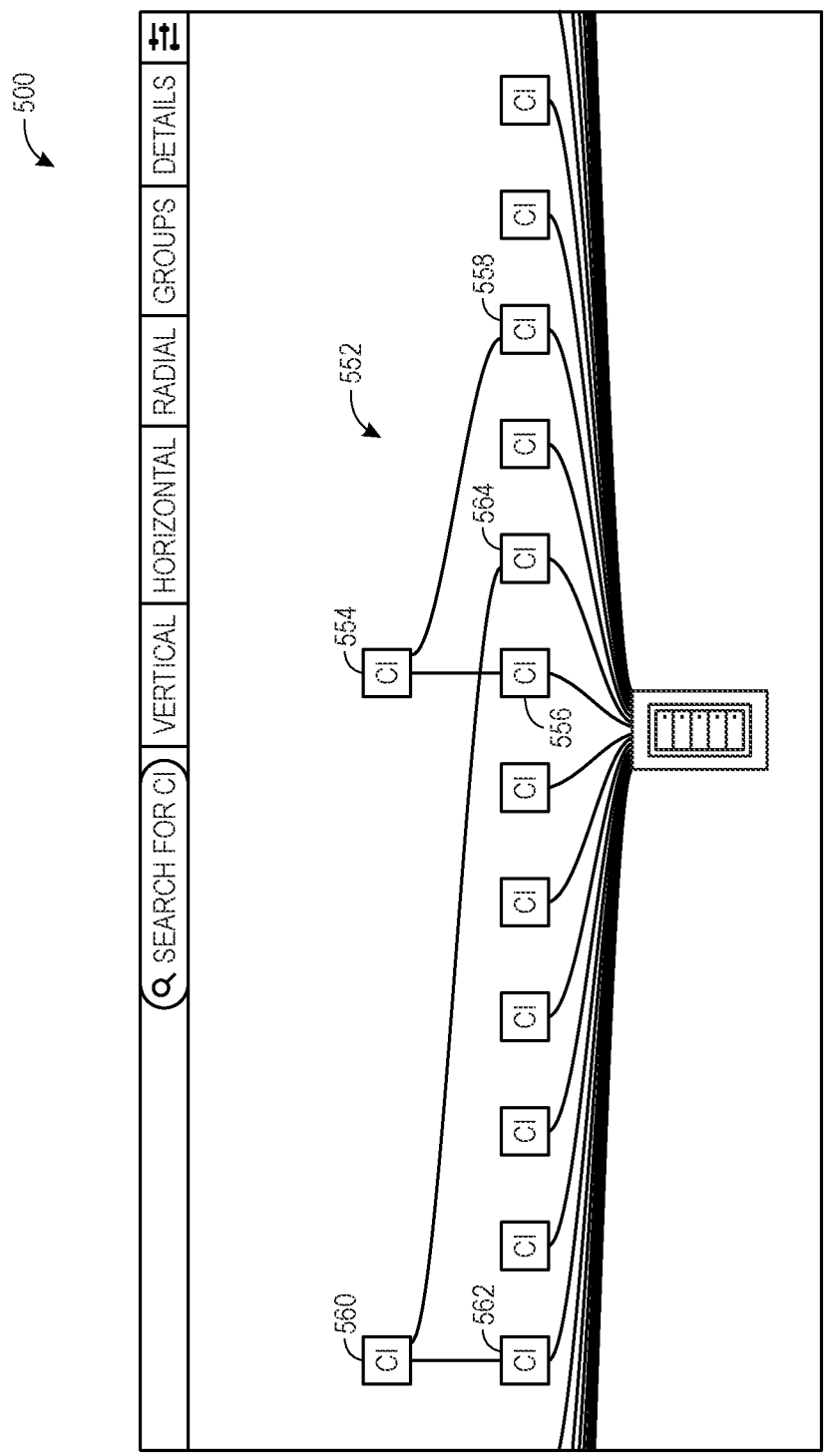
FIG. 8 is a screenshot of a service map, in accordance with aspects of the present disclosure.

It should be noted that the disclosed techniques may enable users to continue to modify CIs and manual service maps using manual techniques, and the modifications (e.g., updates) may be propagated to tag-based service maps. To further illustrate the processes 400 and 500, FIG. 8 is a screenshot 550 of a GUI displaying a service map 552. In general, the service map 552 may correspond to the service map 406 that has not been converted. As shown, the service map 552 includes multiple CIs, some of which are dependent on other CIs as indicated by the lines connecting the various CIs. For example, CI 554 is dependent upon CIs 556 and 558. Similarly, CI 560 is dependent on CIS 562 and 564. It should be understood, however, that the service map 552 shown in FIG. 8 is merely an example and that other service maps are also envisaged. For example, in some embodiments, a service map may include multiple levels of dependency.

Because the service map 552 for a given network may include many CIs, and each CI may be related to many different services, the service map 552 may include a relatively large number of CIs and it may be difficult for a user to discern relationships between CIs as well as to identify errors in CIs that may affect operation of other CIs.

Figure 9:
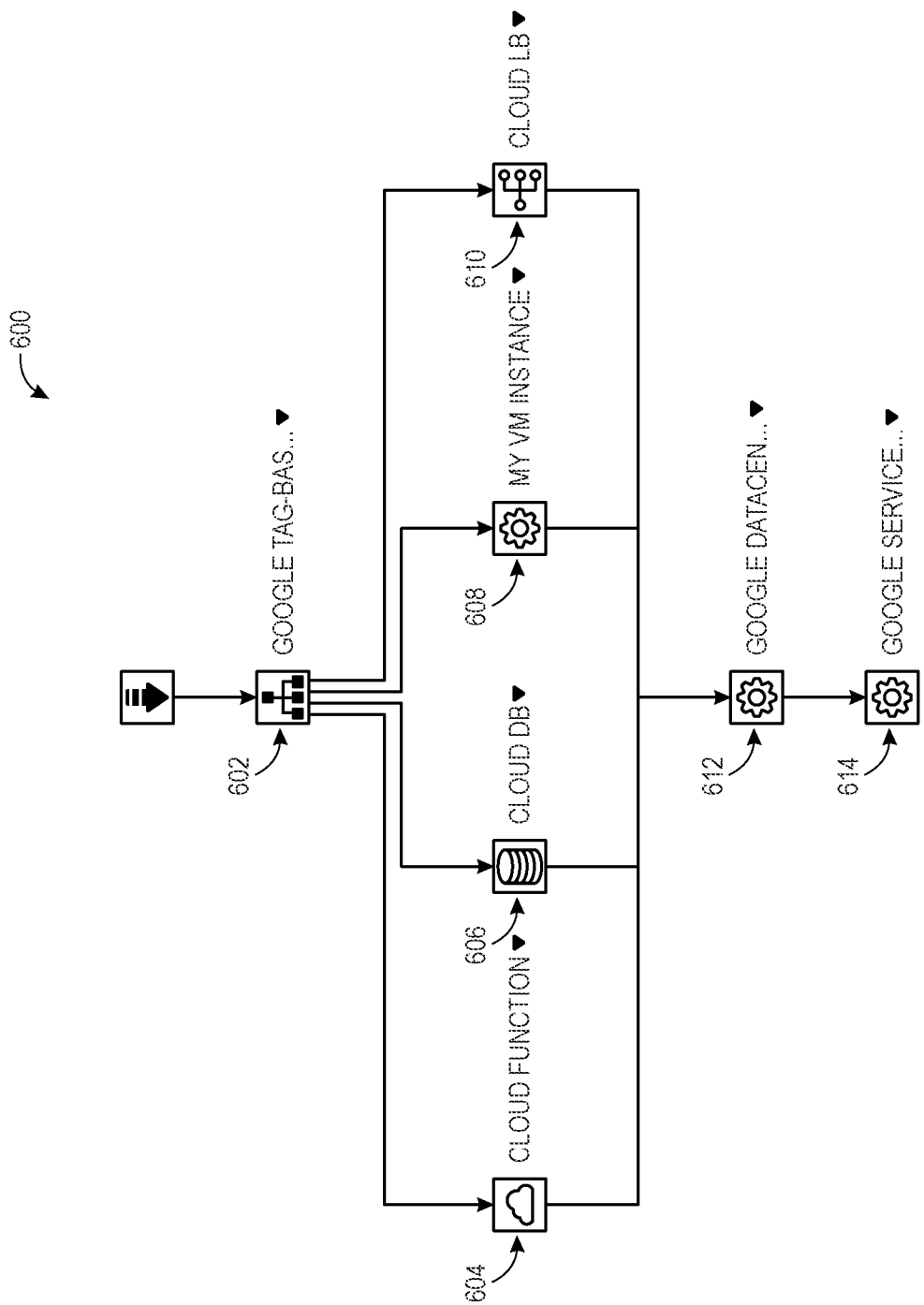
FIG. 9 is a screenshot of a condensed map associated with a converted service map, in accordance with aspects of the present disclosure.

FIG. 9 shows an example of converted service map 600. In the illustrated embodiment, the converted service map 600 includes fewer CIs as compared to the service map 552 of FIG. 8. In the illustrated embodiment, the converted service map 600 includes icons 602, 604, 606, 608, 610, 612, and 614 each associated with respective CIs. More specifically, the illustrated embodiment illustrates an application service associated with icon 602, and the application depends on the CIs associated with icons 604, 606, 608, 610, which each depend on the CI associated with icon 612. The CI associated with icon 612 depends on the CI associated with the icon 614. In general, each icon includes a respective drop-down arrow that, upon selection of the respective drop-down arrow may display information associated with a respective CI, such as incident information, alert information, and the like.

As described herein, a conversion tag may be added, appended, or included with one or more CIs associated with a service map. To illustrate this, FIG. 10 shows a screen shot 650 of an embodiment of a table 652 with records 654 having associated fields storing information for different CIs, or assets. For example, field 656 stores information identifying when a CI was created, field 658 stores information identifying the CI, field 660 stores information identifying a key (e.g., as described above with respect to the key 418 of FIG. 6), and field 662 stores information identifying a value (e.g., as described above with respect to the value 416 of FIG. 6). Accordingly, the fields 660 may identify a converted service map (e.g., as described above with respect to the converted tag-based service map 402 of FIG. 6) associated with each CI. Similarly, the fields 662 may identify a manual service map (e.g., as described above with respect to the convert service map 410 of FIG. 6) associated with a CI.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium comprising computer-executable instructions that, when executed, are configured to cause a processor to:
receive a conversion request to convert a manual service map to a tag-based service map, wherein the manual service map comprises a first plurality of configuration items (CIs);
tag one or more CIs of the first plurality of CIs using one or more respective conversion tags subsequent to receiving the request, wherein each conversion tag of the one or more respective conversion tags indicates a first class associated with the manual service map, wherein each conversion tag of the one or more respective conversion tags indicates a second class associated with the tag-based service map, and wherein the first class is distinct from the second class;
determine a second plurality of CIs based on the first plurality of CIs and the one or more tagged CIs; and
generate the tag-based service map comprising the second plurality of CIs.

2. The non-transitory computer-readable medium of claim 1, wherein each conversion tag of the one or more respective conversion tags links change requests, incidents, alerts, or a combination thereof associated with the manual service map to the tag-based service map.

3. The non-transitory computer-readable medium of claim 1, wherein the second plurality of CIs comprises the one or more tagged CIs.

4. The non-transitory computer-readable medium of claim 1, wherein the second plurality of CIs comprises a subset of the first plurality of CIs.

5. The non-transitory computer-readable medium of claim 1, wherein the computer-executable instructions that, when executed, are configured to cause the processor to tag the one or more CIs comprise instructions to:
retrieve a CI inclusion list indicating the one or more CIs to include in the tag-based service map;
retrieve metadata indicative of a type of CI of each of the one or more CIs;
determine that the metadata associated with the one or more CIs matches reference metadata; and
tag the one or more CIs in response to determining that the metadata associated with the one or more CIs matches the reference metadata.

6. The non-transitory computer-readable medium of claim 1, wherein the computer-executable instructions that, when executed, are configured to cause the processor to generate the tag-based service map comprise instructions to reclassify metadata associated with the second plurality of CIs to indicate the tag-based service map.

7. The non-transitory computer-readable medium of claim 1, wherein the computer-executable instructions, when executed, are further configured to cause the processor to generate a graphical user interface (GUI) comprising the second plurality of CIs.

8. The non-transitory computer-readable medium of claim 1, wherein the manual service map is generated based on a user-submitted query resulting in the first plurality of CIs.

9. The non-transitory computer-readable medium of claim 1, wherein the tag-based service map is generated by filtering the first plurality of CIs based on the one or more respective conversion tags.

10. The non-transitory computer-readable medium of claim 1, wherein each conversion tag of the one or more respective conversion tags indicates the first class using a first identifier associated with the manual service map.

11. The non-transitory computer-readable medium of claim 10, wherein each conversion tag of the one or more respective conversion tags indicates the second class using a second identifier associated with the tag-based service map.

12. A method, comprising:
receiving a conversion request to convert a manual service map to a tag-based service map, wherein the manual service map comprises a first plurality of configuration items (CIs);
tagging one or more CIs of the first plurality of CIs using one or more respective conversion tags subsequent to receiving the request, wherein each conversion tag of the one or more respective conversion tags indicates a first class associated with the manual service map, wherein each conversion tag of the one or more respective conversion tags indicates a second class associated with the tag-based service map, and wherein the first class is distinct from the second class;
determining a second plurality of CIs based on the first plurality of CIs and the one or more tagged CIs; and
generating the tag-based service map based on the second plurality of CIs.

13. The method of claim 12, wherein the request indicates that a subset of the first plurality of CIs should be removed from the manual service map, and wherein the subset is distinct from the one or more tagged CIs.

14. The method of claim 12, further comprising generating a graphical user interface (GUI) comprising the second plurality of CIs.

15. The method of claim 12, wherein each conversion tag links historical information associated with the manual service map to the tag-based service map.

16. The method of claim 12, where tagging the one or more CIs of the first plurality of CIs comprises applying a CI inclusion list to filter out a subset of CIs from the first plurality of CIs.

17. A non-transitory computer-readable medium comprising computer-executable instructions that, when executed, are configured to cause a processor to:
receive a request indicating a change to a first set of configuration items (CIs);
identify a service map that includes a plurality of CIs that comprise the first set of CIs;
tag a second set of CIs of the plurality of CIs with one or more respective conversion tags subsequent to receiving the request, wherein each conversion tag of the one or more respective conversion tags indicates a first class associated with a manual service map, wherein each conversion tag of the one or more respective conversion tags indicates a second class associated with a tag-based service map, and wherein the first class is distinct from the second class; and
generate an updated service map based on the second set of CIs.

18. The non-transitory computer-readable medium of claim 17, wherein each conversion tag comprises a first identifier indicating the first class and a second identifier indicating the second class.

19. The non-transitory computer-readable medium of claim 17, wherein each conversion tag links change requests, incidents, alerts, or a combination thereof associated with the service map to the updated service map.

20. The non-transitory computer-readable medium of claim 17, wherein the request indicates that a subset of the plurality of CIs should be removed from the plurality of CIs.

* * * * *